US008751185B2

(12) United States Patent
Magarida

(10) Patent No.: US 8,751,185 B2
(45) Date of Patent: Jun. 10, 2014

(54) DETECTION DEVICE FOR INTERNAL COMBUSTION ENGINE

(75) Inventor: Naofumi Magarida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 390 days.

(21) Appl. No.: 13/201,795

(22) PCT Filed: Feb. 18, 2009

(86) PCT No.: PCT/JP2009/052772
§ 371 (c)(1),
(2), (4) Date: Aug. 16, 2011

(87) PCT Pub. No.: WO2010/095219
PCT Pub. Date: Aug. 26, 2010

(65) Prior Publication Data
US 2011/0301908 A1 Dec. 8, 2011

(51) Int. Cl.
*G01K 1/00* (2006.01)
*F01N 1/00* (2006.01)
*G01M 15/00* (2006.01)

(52) U.S. Cl.
USPC ............................ 702/130; 60/272; 73/114.69

(58) Field of Classification Search
USPC ................. 702/130, 127, 131, 133, 182–183, 702/189–190, 193; 60/272–273, 286; 73/114.01, 114.69; 324/378, 600, 670; 374/100–101, 107, 135, 141–142, 163
See application file for complete search history.

(56) References Cited

U.S. PATENT DOCUMENTS

| 5,218,946 A | 6/1993 | Wild et al. |
| 2004/0047396 A1 | 3/2004 | Nomura et al. |
| 2006/0102476 A1* | 5/2006 | Niwa et al. ................. 204/425 |

FOREIGN PATENT DOCUMENTS

| JP | A-5-209551 | 8/1993 |
| JP | A-11-082112 | 3/1999 |
| JP | A-2003-232760 | 8/2003 |
| JP | A-2003-240617 | 8/2003 |
| JP | A-2004-101274 | 4/2004 |
| JP | B2-3744486 | 2/2006 |
| JP | B2-3958755 | 8/2007 |
| JP | A-2009-002810 | 1/2009 |

OTHER PUBLICATIONS

International Search Report in International Application No. PCT/JP2009/052772; dated Mar. 24, 2009 (with English-language translation).

* cited by examiner

*Primary Examiner* — Toan Le
(74) *Attorney, Agent, or Firm* — Oliff PLC

(57) ABSTRACT

A detection device for an internal combustion engine is preferably applied to the internal combustion engine which includes a temperature varying member, which is provided in an exhaust system, and whose temperature varies due to gas flow in the exhaust system. A temperature correlation value detection unit detects a correlation value which correlates with the temperature of the temperature varying member. The term correlation value herein includes impedance of the temperature varying member, a signal output value such as current and voltage output sent from the temperature varying member, and/or the temperature varying member's own temperature. A variation calculating unit calculates a variation of the correlation value, in a time period when the gas flow arises, detected by the temperature correlation value detection unit.

5 Claims, 8 Drawing Sheets

FIG. 1
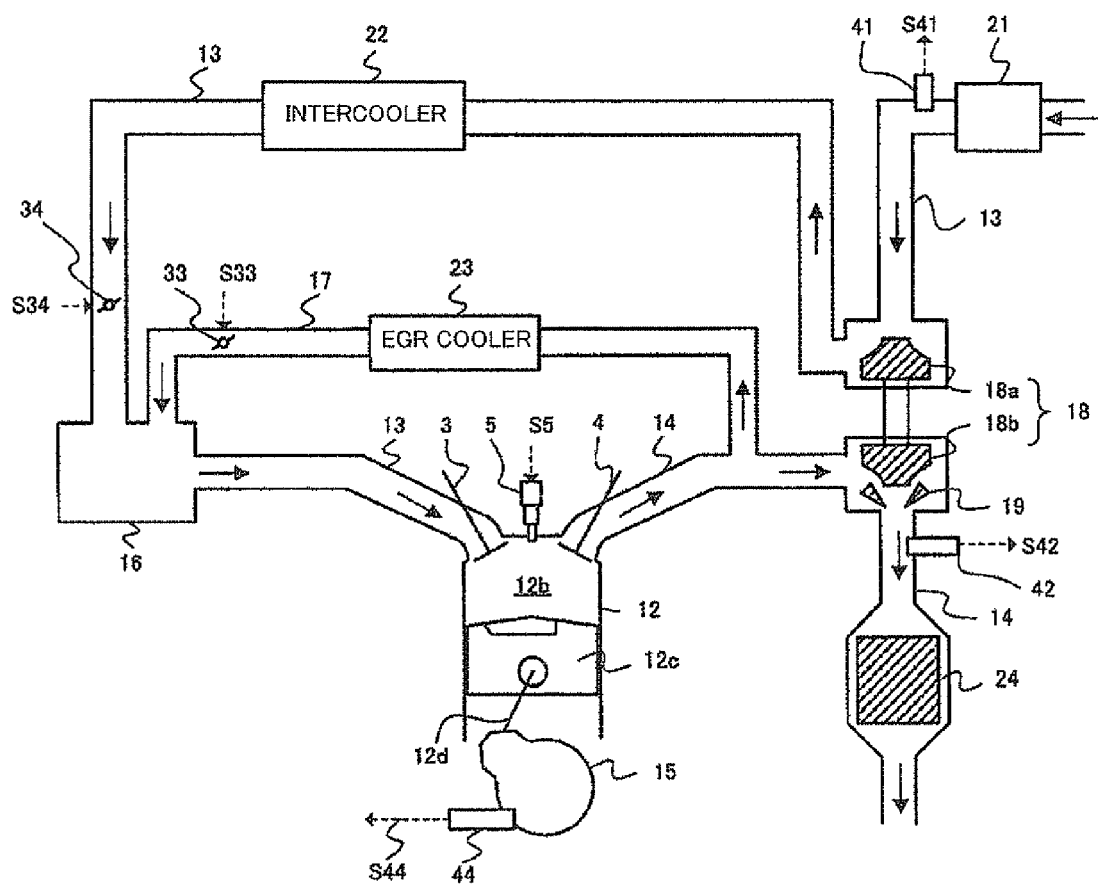
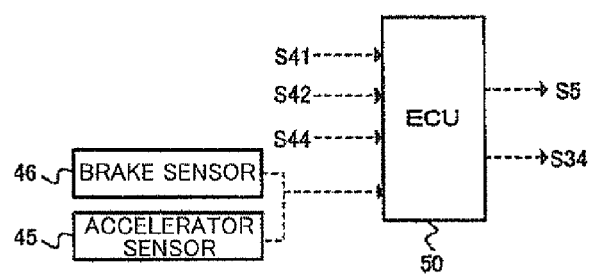

DETECTION DEVICE FOR INTERNAL COMBUSTION ENGINE

TECHNICAL FIELD

The present invention relates to a detection device for an internal combustion engine which detects inhibitors such as particulate matters.

BACKGROUND TECHNIQUE

In an exhaust system of an internal combustion engine, various sensors such as an air-fuel ratio sensor (A/F sensor) for detecting an air-fuel ratio in the exhaust gas are provided. When inhibitors such as particulate matters in the exhaust gas adhere to a detection unit of these kinds of sensors, the sensors become unable to obtain accurate detection values, and thereby the detection accuracy is deteriorated. As a technique for dealing with this, in Patent Reference-1, there is described a technique which determines, at the time when an operation state of a engine is a static state, whether an output value of an oxygen sensor is smaller than a predetermined value or larger than the predetermined value, and which burns up the particulate matters by increasing temperature of an electrical heater for heating up a detection element of the oxygen sensor at the time when the output value is larger than the predetermined value. In Patent References-2 and -3, there are also described technique which relates to the present invention.
Patent Reference-1: Japanese Patent Application Laid-open under No. H11-82112
Patent Reference-2: Japanese Patent No. 3744486
Patent Reference-3: Japanese Patent No. 3958755

DISCLOSURE OF INVENTION

Problem to be Solved by the Invention

However, by the technique described in Patent Reference-1, it is not clear whether the deviation of the output value supplied from the sensor is caused by adhesions of inhibitors or by deterioration of the sensor itself. In the case where the deviation of the output value is caused by the deterioration of the sensor itself, it is meaningless to burn up the particulate matters.

The present invention has been achieved in order to solve the above problem. It is an object of this invention to provide a detection device for an internal combustion engine which can precisely detect adhesions of inhibitors.

Means for Solving the Problem

According to one aspect of the present invention, there is provided a detection device for an internal combustion engine which is applied to the internal combustion engine including a temperature varying member, which is provided in an exhaust system, and whose temperature varies due to gas flow in the exhaust system, including a temperature correlation value detection unit which detects a correlation value which correlates with the temperature of the temperature varying member, and a variation calculating unit which calculates a variation of the correlation value, in a time period when the gas flow arises, detected by the temperature correlation value detection unit.

The above detection device for an internal combustion engine is preferably applied to the internal combustion engine which includes a temperature varying member, which is provided in an exhaust system, and whose temperature varies due to gas flow in the exhaust system. The detection device for the internal combustion engine is for example an ECU (Electronic Control Unit) and functions as a temperature correlation value detection unit and a variation calculating unit. The temperature correlation value detection unit detects a correlation value which correlates with the temperature of the temperature varying member. The term correlation value herein includes impedance of the temperature varying member, a signal output value such as current and voltage sent from the temperature varying member, and the temperature varying member's own temperature. The variation calculating unit calculates a variation of the correlation value, in a time period when the gas flow arises, detected by the temperature correlation value detection unit. According to whether or not inhibitors adhere to the temperature varying member, levels of the difficulty in cooling the temperature varying member and the difficulty in heating up the temperature varying member vary and the variation of the correlation value also varies. Thus, by calculating the variation of the temperature varying member, it becomes possible to precisely detect whether or not inhibitors adhere to the temperature varying member.

In a preferable embodiment of the detection device for an internal combustion engine, the temperature varying member is an electric heater of a gas sensor, and the temperature correlation value detection unit detects impedance of the electric heater as the correlation value.

In another preferable embodiment of the detection device for an internal combustion engine, the temperature varying member is a temperature sensor, and the temperature correlation value detection unit detects a signal output value supplied from the temperature sensor as the correlation value.

In another manner of the detection device for an internal combustion engine, an exhaust temperature sensor which detects temperature of the gas is provided on a streamline which is approximately same as the streamline where the temperature varying member is provided in the exhaust system, and the variation calculating unit calculates a rate of the variation of the correlation value to a variation of an exhaust temperature detected by the exhaust temperature sensor. Thereby it is also possible to precisely detect whether or not inhibitors adhere to the temperature varying member. Additionally, thereby it becomes possible to detect whether or not inhibitors adhere to the temperature varying member only by keeping the gas flow approximately constant during a predetermined time period when the exhaust temperature varies.

In another manner of the detection device for an internal combustion engine, a filter member is provided in the exhaust system, and the temperature varying member is provided at the downstream side of the filter member. Thereby, it becomes possible to determine whether or not the filter is functioning normally.

In another manner of the detection device for an internal combustion engine, a threshold of the variation is set according to an amount of inhibitors which adhere to the temperature varying member, and the detection device further includes a determining unit which determines whether or not the variation calculated by the variation calculating unit is smaller than the threshold. The determining unit is an ECU for example. Thereby it is possible to determine whether or not the amount of the inhibitors which adhere to the temperature varying member is larger than the amount of inhibitors corresponding to the threshold.

BRIEF DESCRIPTION OF THE DRAWINGS

FIG. 1 is a configuration diagram which shows a configuration of an internal combustion engine in the first embodiment;

BRIEF DESCRIPTION OF THE REFERENCE NUMBER

Figure 2:
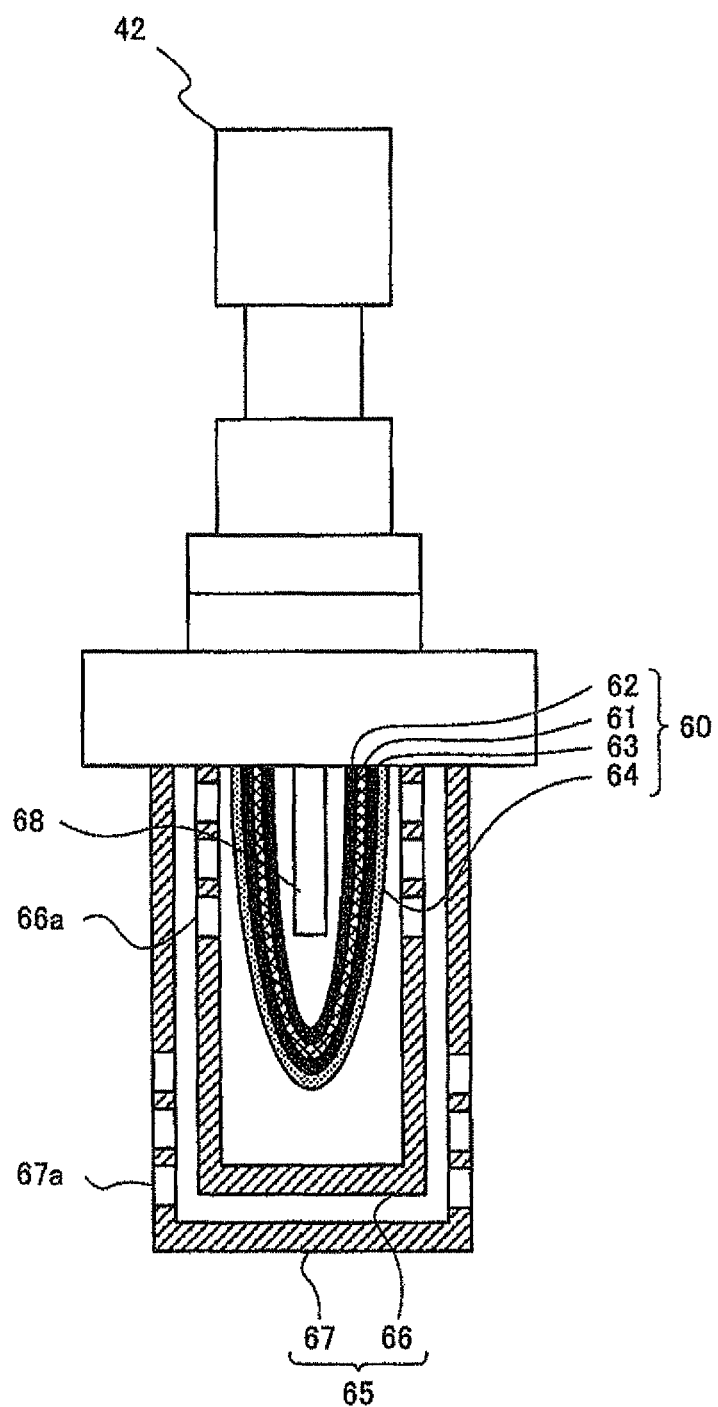
FIG. 2 is a cross-section diagram showing a configuration of the A/F sensor.

3 Intake air valve
4 Exhaust valve
5 Fuel injection valve
12 Cylinder
13 Intake air passage
14 Exhaust passage
17 EGR passage
18 Turbocharger
34 Throttle valve
42 A/F sensor
50 ECU

DETAILED DESCRIPTION OF THE PREFERRED EMBODIMENTS

Preferred embodiments of the present invention will be explained hereinafter with reference to the drawings.

First Embodiment

The first embodiment of the present invention will be described. FIG. 1 is a configuration diagram which shows a configuration of an internal combustion engine in the first embodiment. In FIG. 1, the solid arrows show the flows of gas and the broken arrows show the flows of signals.

The internal combustion engine (engine) is, for example, a diesel engine which is mounted as a power source for driving on a vehicle such as an automobile, and includes plural cylinders 12, an intake air passage 13 and an exhaust passage 14 which are connected to each of the cylinders 12, and a turbocharger 18 which is arranged in series with the intake air passage 13 and the exhaust passage 14. It is noted that the internal combustion engine may be a gasoline engine instead of the diesel engine.

On the exhaust passage 14, there is provided an EGR (Exhaust Gas Recirculation) passage 17 for recirculating a part of exhaust gas from the exhaust passage 14 to the intake air passage 13. Hereinafter, the part of the exhaust gas recirculated by the EGR passage 17 is referred to as the EGR gas.

An EGR cooler 23 for cooling the EGR gas, and an EGR valve 33 for controlling an amount of the EGR gas are provided on the EGR passage 17. The EGR valve 33 is controlled by the control signal S33 supplied from the ECU 50.

On the intake air passage 13, there are provided an air cleaner 21, an air flow meter 41 which detects an amount of air (intake air) drawn in from the external, a throttle valve 34 for controlling the intake air amount, a compressor 18a of the turbocharger 18, an intercooler 22, and a surge tank 16 which can store the intake gas (mixed gas of the EGR gas and the intake air). The air flow meter 41 detects the intake air amount and sends the detection signal S41 corresponding to the detected intake air amount to the ECU 50. The throttle valve 34 is controlled by the control signal S34 supplied from the ECU 50.

On the exhaust passage 14, a turbine 18b of the turbocharger 18, an air-fuel ratio sensor (A/F sensor) 42, and a filter 24 are provided. The A/F sensor 42 detects an air-fuel ratio in the exhaust gas and sends the detection signal S42 corresponding to the detected air-fuel ratio to the ECU 50. The filter 24 collects particulate matters in the exhaust gas. Here, the filter is not limited to what only has the filtering function. Instead, what also has a function of a NOx absorber catalyst which absorbs and reduces NOx in the exhaust gas besides the filtering function may be used.

In the turbocharger 18, the compressor 18a and the turbine 18b are configured to revolve integrally. Here, the turbocharger 18, as shown in FIG. 1, may be a variable geometry turbocharger which has a variable nozzle vane 19 and can control the supercharging pressure for example. In the variable geometry turbocharger, the supercharging pressure is controlled by adjusting the opening degree and controlling the amount of the exhaust gas. It is noted that, instead of the turbocharger 18, another supercharger such as an electrical supercharger can be used as the supercharger.

The intake air passage 13 and the exhaust passage 14 are connected to the combustion chamber 12b of the cylinder 12, and a fuel injection valve 5 for injecting fuel in the combustion chamber 12b is provided on the combustion chamber 12b. The fuel injection valve 5 is controlled by the control signal S5 supplied from the ECU 50. Also, an intake air valve 3 and an exhaust valve 4 are provided on the cylinder 12. The intake air valve 3 controls the flow and cutoff between the intake air passage 13 and the combustion chamber 12b by opening and closing. The exhaust valve 4 controls the flow and cutoff between the exhaust passage 14 and the combustion chamber 12b by opening and closing. In the cylinder 12, a force which depresses the piston 12c to the bottom dead center is transmitted to the crank shaft 15 via the connecting rod 12d, and then the crank shaft 15 rotates. Here, a crank angle sensor 44 is provided near the crank shaft 15. The crank angle sensor 44 detects the rotation angle (crank angle) of the crank shaft 15 and sends the detection signal S44 corresponding to the detected crank angle to the ECU 50.

The ECU (Electronic Control Unit) 50 includes a CPU, a ROM, a RAM, an A/D converter, and input-output interfaces, which are not shown, and controls the engine based on the detection signals supplied from various sensors. Concretely, the ECU 50 receives the detection signals supplied from the air flow meter 41, the crank angle sensor 44, and the A/F sensor 42. The ECU 50 detects operation state of the engine based on the detection signals supplied from these various sensors. The ECU 50 also receives the detection signals according to each of the pedal opening degrees of the accelerator pedal and the brake pedal supplied from the accelerator sensor 45 and the brake sensor 46. The ECU 50 detects the operation request based on the detection signals supplied from these various sensors. The ECU 50 sends the control signals to the EGR valve 33, the throttle valve 34, and the fuel injection valve 5 on the basis of the detected operation state and the detected operation request of the engine.

Here, a description will be given of a configuration of the A/F sensor 42 with reference to FIG. 2. FIG. 2 is a cross-section diagram showing a configuration of the A/F sensor 42.

As shown in FIG. 2, the A/F sensor 92 is a glass-type A/F sensor for example, and includes a sensor element 60, a cover 65, and a heater 68.

The sensor element 60 includes a solid electrolyte 61, an atmosphere side electrode 62 which is provided on the inner surface of the solid electrolyte 61, an exhaust side electrode 63 which is provided on the outer surface of the solid electrolyte 61, and a ceramic coating 64 which covers the exhaust side electrode 63. The heater 68 is provided at the inside of the atmosphere side electrode 62.

The solid electrolyte 61 is made of zirconia for example and is configured to function (become activated) as an oxygen ion conductor on a hot condition of equal to or higher than 300 degree for example. The heater 68 is an electric heater, and heats up and activates the solid electrolyte 61. The heater 68 is controlled by the ECU 50. The exhaust side electrode 63 and the atmosphere side electrode 62 are porous-platinum electrodes. In the inside of the solid electrolyte 61, oxygen ions can transfer freely, and if there is a difference (a difference of the oxygen partial pressure) of the oxygen densities in the both ends, the oxygen ions transfer from one side to the other side in order to reduce the density difference. This transfer phenomenon of the oxygen ions become the transfers of electrons and generate electromotive force between the pair of electrodes consisting of the exhaust side electrode 63 and the atmosphere side electrode 62. This electromotive force becomes the output voltage of the A/F sensor 42, and the larger the difference of the oxygen densities is, the larger the voltage becomes.

The cover 65 is provided to cover the sensor element 60 and includes an inner cover 66 and an outer cover 67.

On the cover 65, small holes are provided to let the exhaust gas pass through. Concretely, as shown in FIG. 2, small holes 66a and 67a are provided on the inner cover 66 and the outer cover 67, respectively. In the example shown in FIG. 2, the holes 66a of the inner cover 66 and the holes 67a of the outer cover 67 are provided not to overlap with each other. It is noted that the holes 66a of the inner cover 66 and the holes 67a of the outer cover 67 may be provided to overlap with each other.

Here, in the holes of the cover 65, clogging is likely to happen due to adhesions of inhibitors such as particulate matters in the exhaust gas at the time when the exhaust gas passes. For example, in a case where a reductant addition valve is set on the exhaust passage 14 at the upstream side of the A/F sensor 42, droplets of the reductant adhere to these holes of the cover 65 and the inhibitors adhere to the holes by letting the adherent reductant function as a binder and thereby the clogging in the holes of the cover 65 occurs. Once the clogging in the holes of the cover 65 occurs, it becomes hard for the exhaust gas to reach the sensor element 60 and the detection accuracy of the A/F sensor 42 degrades. For this reason, it is important to know whether or not the clogging in the holes of the cover 65 of the A/F sensor 42 occurs.

Hence, in the detection method for the internal combustion engine in the first embodiment, the ECU 50 determines whether or not the clogging in the holes of the cover 65 of the A/F sensor occurs based on a temperature variation of the heater 68 in a predetermined time period. A concrete description will be given below.

Figure 3:
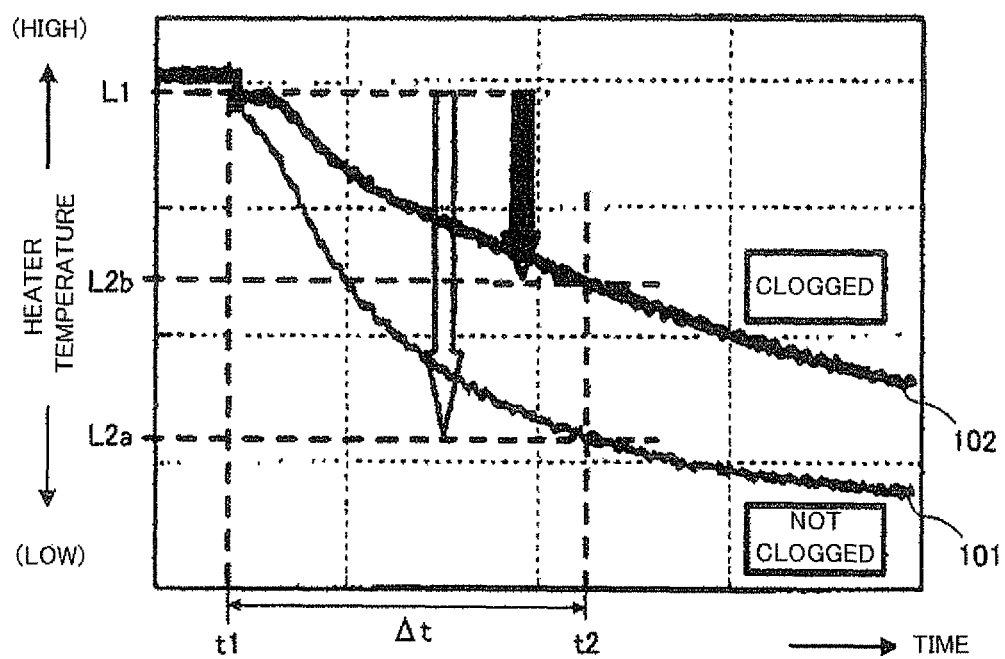
FIG. 3 shows the graphs indicating the time variation of the temperature of the heater of the A/F sensor.

FIG. 3 shows the graphs each of which indicates the time variation of temperature in the heater 68 of the A/F sensor 42. The graph 101 indicates a graph in a case where the clogging in the holes of the cover 65 of the A/F sensor 42 does not occur, and the graph 102 indicates a graph in a case where the clogging in the holes of the cover 65 of the A/F sensor 42 occurs.

At the time t1, the temperature of the heater 68 is L1 in both of the case where the clogging in the holes of the cover 65 does not occur and the case where the clogging in the holes of the cover 65 occurs. At the time t1, the ECU 50 stops the fuel injection by the fuel injection valve 5 thereby to stop the combustion in the cylinders 12 and lets the gas pass through the exhaust passage 14 from the intake air passage 13. In this case, since the cold gas blows down to the A/F sensor 42, the temperature of the heater 68 decrease bit by bit as time goes on.

Here, compared to the case where the clogging in the holes of the cover 65 does not occur, in the case where the clogging in the holes of the cover 65 occurs, it becomes hard for the gas to pass through the holes, and thereby wind force of the gas to the sensor element 60 of the A/F sensor 42 becomes weak and it is difficult for the heater 68 to be cooled by the gas. For this reason, as shown in FIG. 3, compared to the case (see the graph 101) where the clogging in the holes of the cover 65 does not occur, in the case (see the graph 102) where the clogging in the holes of the cover 65 occurs, the amount of the temperature decrease over time becomes smaller. For example, at the time t2 when a predetermined time period Δt has elapsed since the time t1, in the case where the clogging in the holes of the cover 65 does not occur, the temperature of the heater 68 becomes L2a as indicated by the white arrow in FIG. 3. In contrast, in the case where the clogging in the holes of the cover 65 occurs, the temperature of the heater becomes L2b (>L2a) as indicated by the black arrow in FIG. 3.

Hence, in the detection method for the internal combustion engine in the first embodiment, at the time t2, the ECU 50 determines whether or not the amount of the temperature decrease of the heater 68 becomes smaller than a clogging criterion value predetermined in advance. Here, the clogging criterion value, for example, is set to the amount |L2a−L1| (corresponding to the length of the white arrow in FIG. 3) of the temperature decrease of the heater 68 in the case where the clogging in the holes of the cover 65 does not occur. The ECU 50 determines that the clogging in the holes of the cover 65 occurs in the case where the amount of the temperature decrease of the heater 68 is smaller than the clogging criterion value, and determines that the clogging in the holes of the cover 65 does not occur in the case where the amount of the temperature decrease of the heater 68 is equal or larger than the clogging criterion value. Thereby the ECU 50 can detect whether or not the clogging in the holes of the cover 65 of the A/F sensor 42 occurs.

Figure 4:
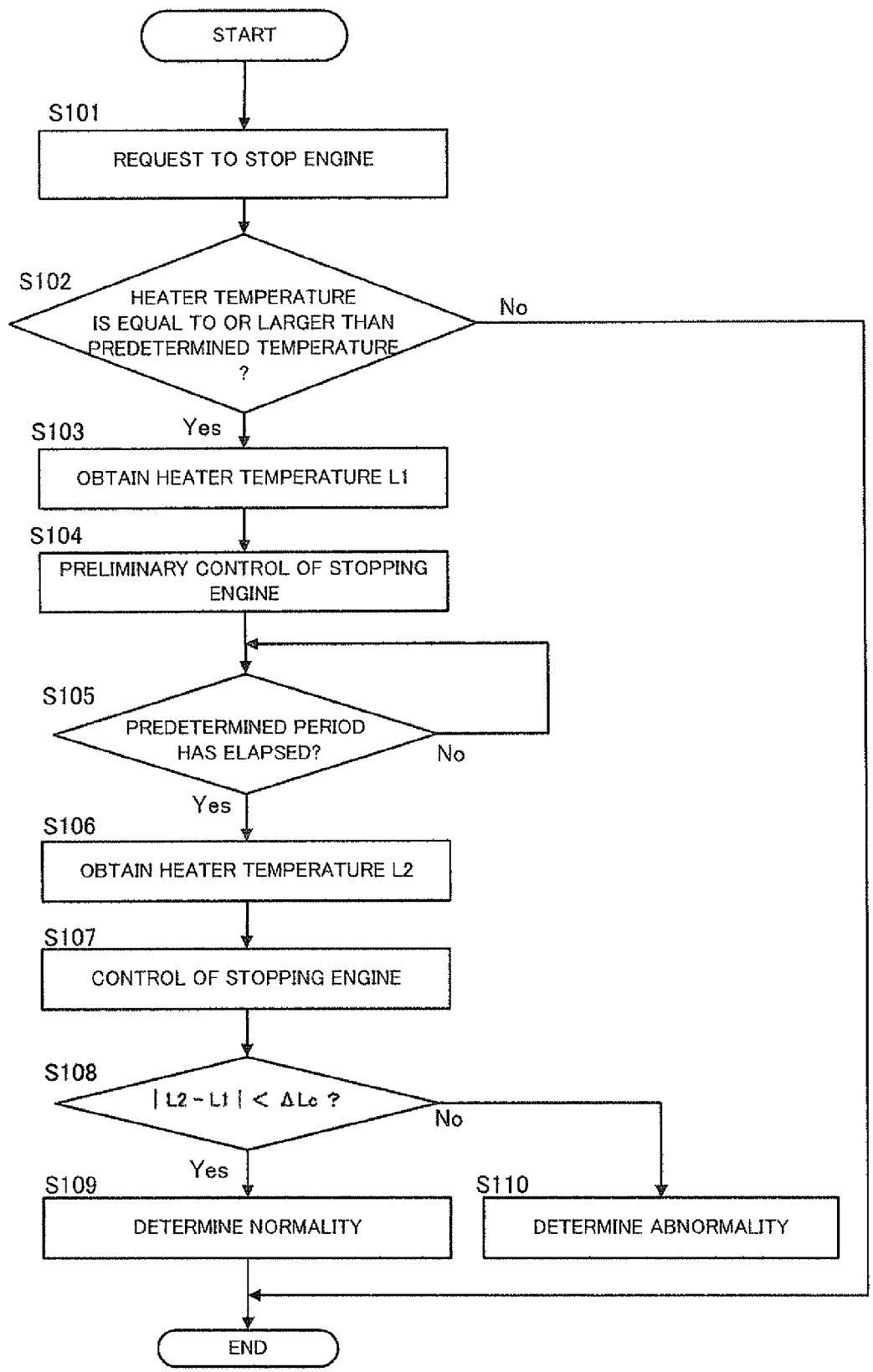
FIG. 4 is a flow chart indicating the clogging detection method for the A/F sensor.

Next, a description will be given of the above clogging detection method which detects the clogging of the cover 65 of the A/F sensor 42 with reference to FIG. 4. FIG. 4 is a flow chart indicating the clogging detection method.

At step S101, the ECU 50 recognizes a request to stop the engine on the basis of the operation state of the engine and then the process goes to step S102. The ECU 50 recognizes the request to stop the engine, for example, due to the change to an idle operation state or a motoring time of a hybrid vehicle which mounts the engine.

At step S102, the ECU 50 detects the temperature of the heater 68 and determines whether or not the temperature of the heater 68 is equal to or larger than a predetermined temperature. Here, the predetermined temperature is, for example, temperature of the heater 68 at which the A/F sensor 42 is activated. The ECU 50, for example, measures the impedance of the heater 68 and then can detect the temperature of the heater 68 on the basis of the impedance measured. When the ECU 50 determines that the temperature of the heater 68 is equal to or larger than the predetermined temperature (step S102: Yes), the process goes to step S103. On the other hand, when determining that the temperature of the heater 68 is smaller than the predetermined temperature (step S102: No), the ECU 50 executes a normal control process of stopping the engine and then ends the control process.

At step S103, the ECU 50 obtains the temperature L1 of the heater 68 at this time. After then, the ECU 50 proceeds to the process at step S104.

At step S104, the ECU 50 executes the preliminary control of stopping the engine. Concretely, by sending the control signal S5 to the fuel injection valve 5 thereby to stop the fuel injection, the ECU 50 stops the combustion in the cylinder 12. Also, by sending the control signal S33 to the EGR valve 33 thereby to let the EGR valve 33 be fully closed, and sending the control signal S34 to the throttle valve 34 thereby to control the opening degrees, the ECU 50 keeps the gas flow amount in the exhaust passage 14 approximately constant. It is noted that, for a variable geometry turbocharger, the ECU 50 additionally controls the opening degrees of the variable nozzle vane 19 in order to keep the gas flow amount in the exhaust passage 14 approximately constant. Thereby it becomes possible to let the cold gas (air) pass through the exhaust passage 14 from the intake air passage 13. After this, the ECU 50 proceeds to the process at step S105.

At step S105, the ECU 50 determines whether or not the predetermined time period Δt has elapsed since the preliminary control of stopping the engine was conducted, and when determining that the predetermined time period Δt has not passed (step S105: No), the ECU 50 repeatedly executes the process at step S105. On the other hand, when determining that the predetermined time period Δt has elapsed (step S105: Yes), the ECU 50 proceeds to the process at step S106, and for example by measuring the impedance of the heater 68, the ECU 50 obtains the temperature L2 at this time. After this, the ECU 50 proceeds to the process at step S107.

At step S107, the ECU 50 executes a control of stopping the engine. Concretely, the ECU 50 decreases the number of engine revolution to 0 and thereby stops the engine completely. After this, the ECU 50 proceeds to the process at step S108.

At step S108, the ECU 50 determines whether or not the temperature difference |L2−L1| of the temperatures of the heater 68 is smaller than the clogging criterion value ΔLc. Here, the clogging criterion value ΔLc is the amount of the temperature decrease of the heater 68 after the predetermined time period Δt in the case where the clogging in the holes of the cover 65 does not occur. When determining that the temperature difference |L2−L1| is smaller than the clogging criterion value ΔLc (step S108: Yes), the ECU 50 determines that the A/F sensor 42 is functioning normally, i.e., the clogging in the holes of the cover 65 of the A/F sensor 42 does not occur (step S109). On the other hand, when determining that the temperature difference |L2−L1| is equal to or larger than the clogging criterion value ΔLc (step S108: No), the A/F sensor 42 has an abnormality, i.e., the clogging in the holes of the cover 65 of the A/F sensor 42 occurs (step S110). After executing the processes at step S109 or step S110, the ECU 50 ends the control process. It is noted that the ECU 50 may execute the processes at step S108 to S110 and the process at step S107 in the inverse order. Namely, the ECU 50 may execute the control of stopping the engine at step S107 after executing the processes at step S108 to S110.

As described above, in the detection method for the internal combustion engine in the first embodiment, the ECU 50 lets the cold gas (air) pass through the exhaust passage 14 during the predetermined time period and calculates the amount of the temperature decrease of the heater 68 in the predetermined time period. The amount of the temperature decrease of the heater 68 varies due to whether or not the clogging in the holes of the cover 65 of the A/F sensor 42 occurs. Therefore, by calculating the amount of the temperature decrease of the heater 68, the ECU 50 can detect whether or not the clogging in the holes of the cover 65 of the A/F sensor 42 occurs. Also, in the detection method for the internal combustion engine in the first embodiment, since the temperature variation of the heater 68 is used, it is possible to precisely detect whether or not the clogging in the holes of the cover 65 occurs without an influence by the degree of deterioration of the sensor element 60.

Second Embodiment

Next, the second embodiment of the present invention will be described below.

Figure 5:
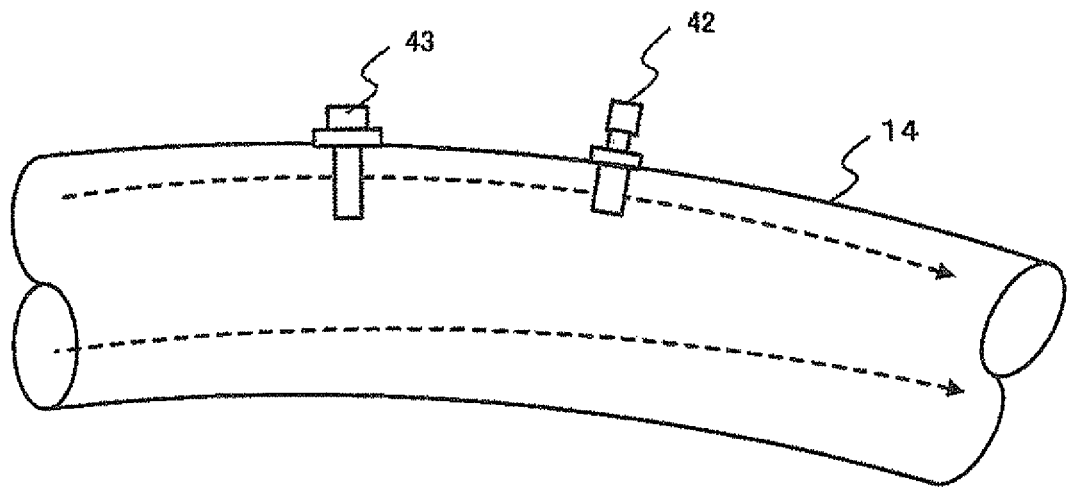
FIG. 5 is a configuration diagram showing a part of the exhaust passage of the internal combustion engine in the second embodiment.

FIG. 5 is a configuration diagram showing a part of the exhaust passage of the internal combustion engine in the second embodiment. The configuration of the internal combustion engine in the second embodiment has an exhaust temperature sensor 43 on the exhaust passage 14 in addition to the configuration of the internal combustion engine in the first embodiment. Concretely, the exhaust temperature sensor 43 is provided on a streamline which is approximately same as the streamline where the A/F sensor 42 is provided and is exposed to the exhaust gas which has approximately-same temperature as the exhaust gas to which the A/F sensor 42 is exposed. For example, an exhaust temperature sensor for estimating the temperature of the filter 24, which is originally provided on the exhaust passage 14 at the upstream side of the filter 24, can be used as this kind of exhaust temperature sensor 43.

Figure 6A:
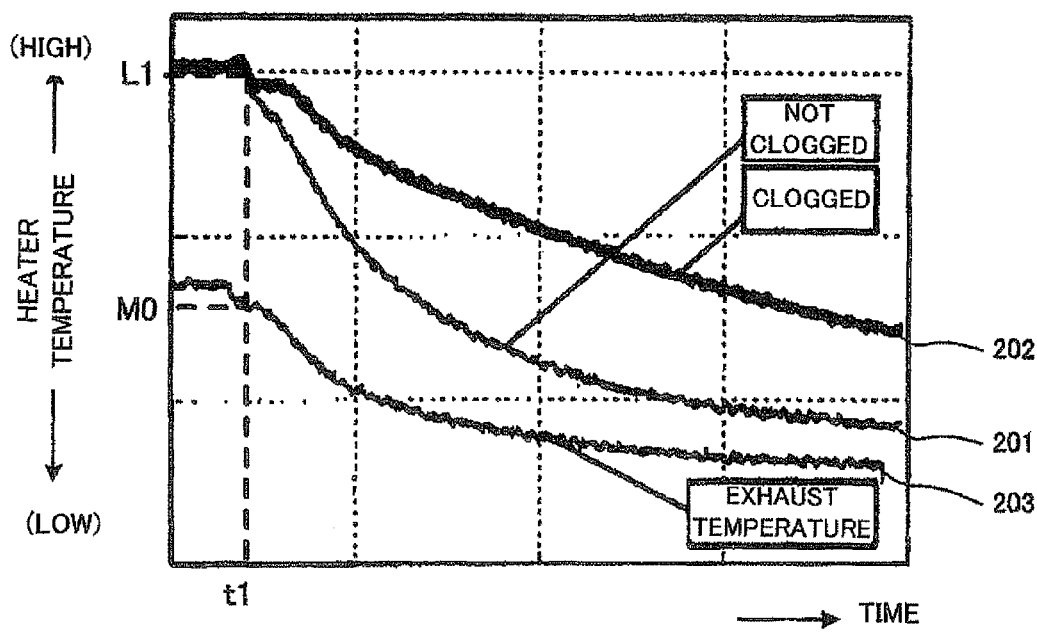
FIGS. 6A and 6B show the graphs each of which indicates the time variation of each temperature at the heater of the A/F sensor and the exhaust temperature sensor and graphs each of which indicates the relationship between the temperature of the heater and the exhaust temperature.

FIG. 6A shows the graphs each of which indicates the time variation of each temperature at the heater 68 of the A/F sensor 42 and the exhaust temperature sensor 43. The graph 201 indicates the temperature variation of the heater 68 in the case where the clogging in the holes of the cover 65 of the A/F sensor 42 does not occur, and the graph 202 indicates the temperature variation of the heater 68 in the case where the clogging in the holes of the cover 65 of the A/F sensor 42 occurs, and the graph 203 indicates the variation of the temperature which is detected by the exhaust temperature sensor 43. Hereinafter, temperature which is detected by the exhaust temperature sensor 43 is referred to as "exhaust temperature".

At the time t1, the ECU 50 stops the fuel injection by the fuel injection valve 5 thereby to stop the combustion in the cylinders 12 and lets the gas pass through the exhaust passage 14 from the intake air passage 13. Temperature which is detected by the exhaust temperature sensor at this time t1 is expressed as "MO", and temperature of the heater 68 of the A/F sensor 42 at the time t1 is expressed as "L1".

Figure 6B:
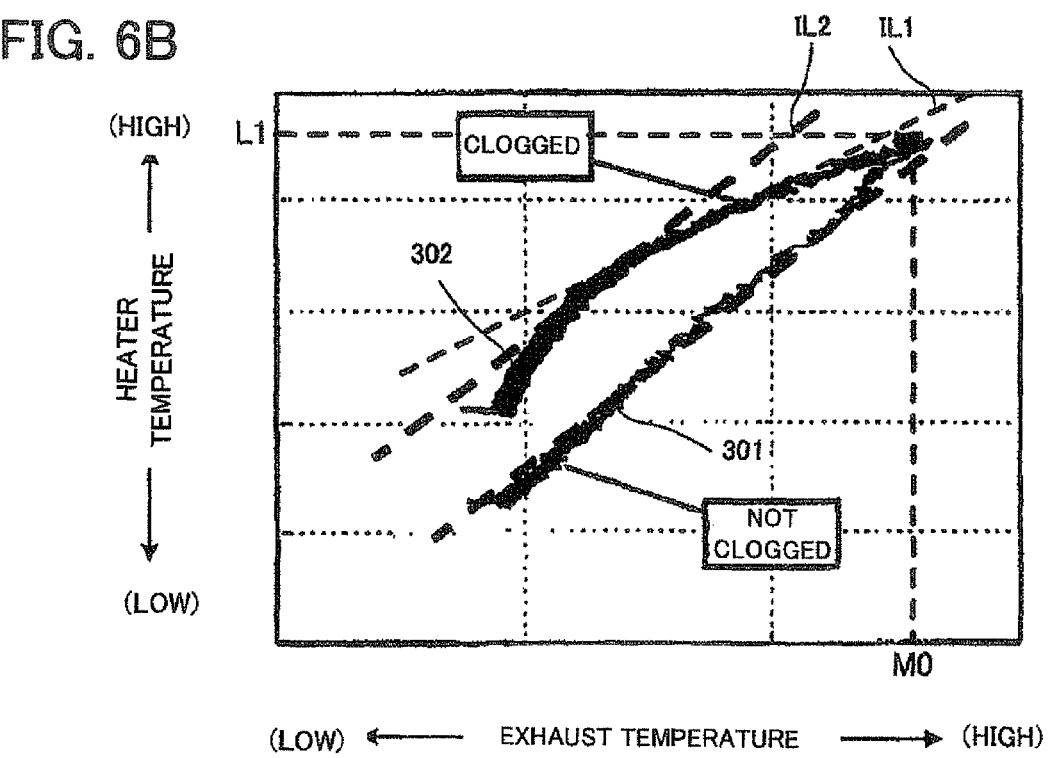

FIG. 6B shows the graphs each of which indicates the relationship between the temperature of the heater 68 and the exhaust temperature. In FIG. 6B, the graphs in FIG. 6A is modified to the graphs each of which indicates the relationship between the temperature of the heater 68 and the exhaust temperature. The graph 301 is a graph which indicates the relationship between the temperature of the heater 68 and the exhaust temperature in the case where the clogging in the holes of the cover 65 of the A/F sensor 42 does not occur. The graph 302 is a graph which indicates the relationship between the temperature of the heater 68 and the exhaust temperature in the case where the clogging in the holes of the cover 65 of the A/F sensor 42 occurs.

As shown in FIG. 6B, whereas the graph 301 is approximately linear, the graph 302 is curved toward the direction where the temperature of the heater 68 becomes higher. As indicated by the graph 301, in the case where the clogging in the holes of the cover 65 of the A/F sensor 42 does not occur, the ratio of the temperature variation of the heater 68 to the variation of the exhaust temperature is approximately constant. In contrast, as indicated by the graph 302, in the case where the clogging in the holes of the cover 65 of the A/F sensor 42 occurs, the ratio of the temperature variation of the heater 68 to the variation of the exhaust temperature varies significantly.

For example, in response to the decrease of the exhaust temperature to a smaller value than the temperature MO, the ratio of the temperature decrease of the heater 68 in the case where the clogging in the holes of the cover 65 of the A/F sensor 42 does not occur becomes approximately constant as indicated by the graph 301. On the other hand, as indicated by the tangent lines IL1, IL2 to the graph 302, the gradients of the tangent lines to the graph 302 becomes larger and larger in response to the decrease of the exhaust temperature to a smaller value than the temperature MO. In other words, the ratio of the temperature decrease of the heater 68, in the case where the clogging in the holes of the cover 65 of the A/F sensor 42 occurs, becomes larger and larger as the exhaust temperature decreases from the temperature MO.

Hence, in the detection method for the in the internal combustion engine in the second embodiment, the ECU 50 calculates the ratio of the temperature variation of the heater 68 to the variation of the exhaust temperature and determines whether or not the ratio of the temperature variation is approximately constant. For example, the ECU 50 detects temperature of the heater 68 per a predetermined time period while the exhaust gas varies, and calculates a map, like what is shown in FIG. 6B, which indicates a relationship between the exhaust temperature and the temperature of the heater 68. Then, by using the map, the ECU 50 calculates the ratio of the temperature variation of the heater 68 to the variation of the exhaust temperature and determines whether or not the ratio calculated is approximately constant. When determining that the ratio calculated is approximately constant, the ECU 50 determines that the clogging in the holes of the cover 65 of the A/F sensor 42 does not occur. In contrast, the ECU 50 determines that the clogging in the holes of the cover 65 of the A/F sensor 42 occurs in a case where the ratio calculated is not constant and is changing toward the direction where the temperature of the heater 68 becomes higher over the variation of the exhaust temperature as indicated by the graph 302. For example, in the case where the ratio of the temperature decrease of the heater 68 becomes larger and larger as the exhaust temperature decreases from the temperature MO, the ECU 50 determines that the temperature of the heater 68 is changing toward the direction where the temperature of the heater 68 becomes higher and that the clogging in the holes of the cover 65 of the A/F sensor 42 occurs.

As described above, in the detection method for the in the internal combustion engine in the second embodiment, similarly to the detection method for the internal combustion engine in the first embodiment, since the temperature variation of the heater 68 is used, it is possible to precisely detect whether or not the clogging in the holes of the cover 65 occurs without the influence by the degree of deterioration of the sensor element 60. Furthermore, in the detection method for the internal combustion engine in the second embodiment, the ECU 50 executes the clogging detection process of the cover 65 of the A/F sensor 42 on the basis of the temperature variation of the exhaust temperature which is detected by the exhaust temperature sensor 43. Therefore, in the detection method for the internal combustion engine in the second embodiment, without stopping the combustion in the cylinders 12 and significantly decreasing the temperature of the gas which flows in the exhaust passage, only by keeping the flow amount of the exhaust gas approximately constant during the predetermined time period when the exhaust temperature is changing, it is possible to precisely detect whether or not the clogging in the holes of the cover 65 of the A/F sensor 42 occurs. Thus, in the detection method for the internal combustion engine in the second embodiment, for example, even at the time of an idle operation state, it is possible to detect whether or not the clogging in the holes of the cover 65 of the A/F sensor 42 occurs.

Third Embodiment

Next, the third embodiment of the present invention will be described. The configuration of the internal combustion engine in the third embodiment is the same as the configuration (FIG. 1) of the internal combustion engine in the first embodiment.

Figure 7:
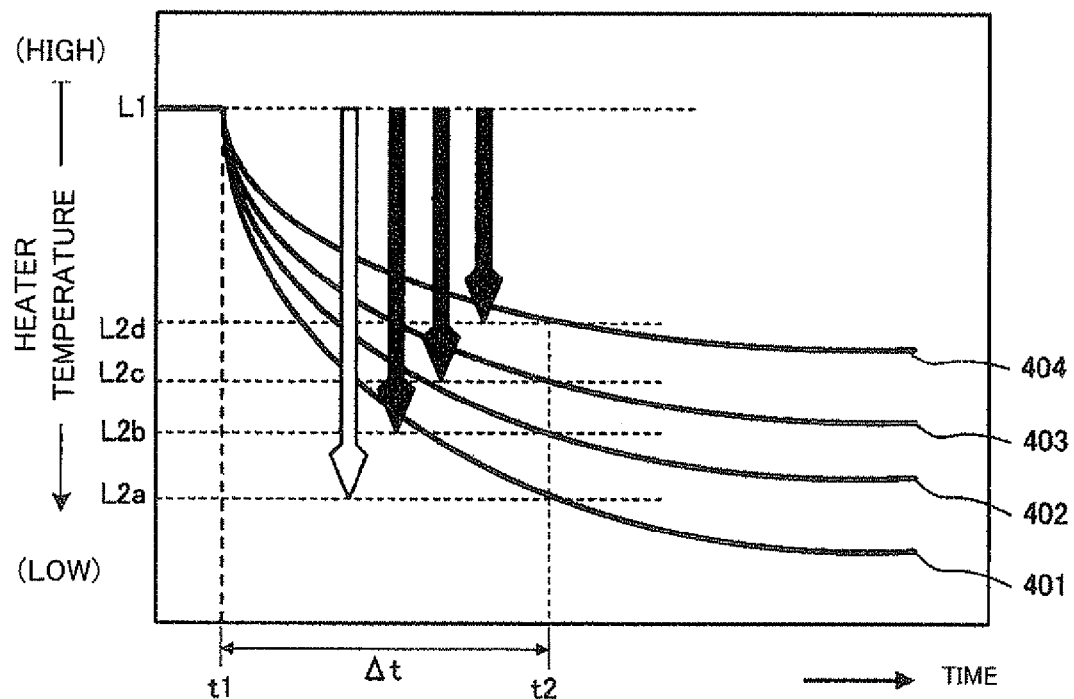
FIG. 7 shows graphs each of which indicates the time variation of the temperature of the heater of the A/F sensor.

FIG. 7, similarly to FIG. 3, shows the graphs each of which indicates the time variation of the temperature of the heater 68 of the A/F sensor 42. The graph 401 indicates temperature variation of the heater 68 in the case where the clogging in the holes of the cover 65 of the A/F sensor 42 does not occur and each of the graphs 402 to 404 indicates the temperature variation of the heater 68 in the case where the clogging in the holes of the cover 65 of the A/F sensor 42 occurs. In FIG. 7, the state of the A/F sensor 42 indicated by the graph 404 has the greatest degree of the clogging in the holes of the cover 65, and the state of the A/F sensor 42 indicated by the graph 402 has the smallest degree of the clogging in the holes of the cover 65, out of the all states of the A/F sensor 42 indicated by the graphs 402 to 404.

At the time t1, the temperature of the heater 68 is L1 in both the case where the clogging in the holes of the cover 65 does not occur and the case where the clogging in the holes of the cover 65 occurs. At the time t1, the ECU 50 stops the fuel injection by the fuel injection valve 5 thereby to stop the combustion in the cylinders 12 and lets the gas pass through the exhaust passage 14 from the intake air passage 13.

At the time t2 when a time period Δt predetermined has elapsed since the time t1, as indicated by the white arrow, the temperature of the heater 68, in the case where the clogging in the holes of the cover 65 does not occur, becomes L2a. In contrast, as indicated by the black arrows, the temperatures of the heater 68, in the case where the clogging in the holes of the cover 65 occurs, become L2b to L2d. In other words, the greater the degree of the clogging in the holes of the cover 65 is, the smaller the amount (the length of the black arrow) of the temperature decrease becomes. This is because, the greater the degree of the clogging in the holes of the cover 65 is, the harder it becomes for the gas to pass through the holes.

Hence, in the detection method for the internal combustion engine in the third embodiment, the ECU 50 sets a threshold of the amount of the temperature decrease of the heater 68 in accordance with the amounts of inhibitors which adhere to the holes of the cover 65 and then determines whether or not the amount of the temperature decrease of the heater 68 is smaller than the threshold. Thereby it is possible to determine whether or not the amount of the inhibitors which adhere to the holes of the cover 65 is larger than the amount of inhibitors corresponding to the threshold. For example, by setting in advance the threshold in accordance with the limit amount of inhibitors which can be cleared by cleansing the A/F sensor 42, the ECU 50 can determine whether or not inhibitors the amount of which can be cleared by the cleansing adhere to the A/F sensor 42. Concretely, the ECU 50 determines that the inhibitors the amount of which can be cleared by the cleansing adhere to the A/F sensor 42 when the amount of the temperature decrease is smaller than the threshold. At this time, the ECU 50 can inform the driver of the abnormal state where an exchange of the A/F sensor 42 is encouraged, for example, by lighting up a caution-advisory indicator provided on the driving seat.

In the above example, the first embodiment is applied as an example, but the second embodiment and the third embodiment can be combined. In the second embodiment, the ECU 50 determines that the temperature of the heater 68 is changing toward the direction which the temperature of the heater 68 becomes higher and that the clogging in the holes of the cover 65 of the A/F sensor 42 occurs in the case where the rate of the temperature decrease of the heater 68 becomes larger and larger as the exhaust temperature decreases from the temperature MO. The larger the amount of the inhibitors is, the larger the degree of the temperature increase of the heater 68 becomes. Namely, the graph 302 shown in FIG. 6B curves toward the direction where temperature of the heater 68 becomes higher. Thus, similarly to the above example, in the case of letting the exhaust temperature decrease from the temperature MO, by setting the threshold of the rate of the temperature decrease of the heater 68 in accordance with the amount of the inhibitors which adhere to the holes of the cover 65, the ECU 50 can determine whether or not the amount of the inhibitors which adhere to the holes of the cover 65 is larger than the amount of inhibitors corresponding to the threshold.

Fourth Embodiment

Next, the fourth embodiment of the present invention will be described below.

Figure 8:
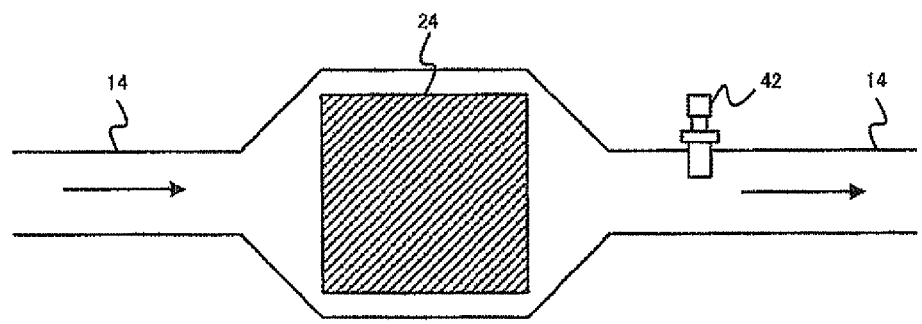
FIG. 8 shows a configuration diagram showing a part of the exhaust passage of the internal combustion engine in the fourth embodiment.

FIG. 8 is a configuration diagram showing a part of the exhaust passage of the internal combustion engine in the fourth embodiment. As shown in FIG. 8, in the internal combustion engine in the fourth embodiment, the A/F sensor 42 is provided on the exhaust passage 14 at the downstream side of the filter 24. Other part of the configuration is similar to the configuration (FIG. 1) of the internal combustion engine in the first embodiment.

The filter 24 has a partition whose pores are open and collects the inhibitors in the exhaust gas by the partition by letting the exhaust gas pass through the partition. In the partition, oxidation catalysts such as platinum (Pt) and cerium oxide (CeO2) are supported and the inhibitors collected is oxidized by the oxidation catalysts. Therefore, when the filter 24 is functioning normally, the inhibitors do not almost adhere to the holes of the cover 65 of the A/F sensor 42 provided on the exhaust passage 14 at downstream side of the filter 24.

In contrast, in the case where the function of the filter 24 which collects the inhibitors in the exhaust gas has decreased due to cracks of the partition, the inhibitors drains into the exhaust passage 14 at downstream side of the filter 24. Hence, in this case, the inhibitors adhere to the holes of the cover 65 of the A/F sensor 42 provided on the exhaust passage 14 at the downstream side of the filter 24 and thereby the clogging occurs.

Hence, in the detection method for the internal combustion engine in the fourth embodiment, the ECU 50 calculates the temperature variation of the heater 68 of the A/F sensor 42 provided on the exhaust passage 14 at the downstream side of the filter 24 and, by using the detection method for the internal combustion engine in the first or the second embodiment, determines whether or not the clogging in the holes of the cover 65 of the A/F sensor 42 occurs. Thereby it becomes possible to determine whether or not the filter 24 is functioning normally. Concretely, when determining that the clogging in the holes of the cover 65 of the A/F sensor 42 occurs, the ECU 50 can determine that the function of the filter 24 has decreased, and when determining that the clogging in the holes of the cover 65 of the A/F sensor 42 does not occur, the ECU 50 can determine that the function of the filter 24 is functioning normally.

[Application]

Next, an application will be described below. In each of the above embodiments, the ECU 50 determines whether or not the clogging in the holes of the cover 65 occurs on the basis of the temperature variation of the heater 68. These detection methods take advantage of the fact that the gas flow amount to the heater 68 in the case where the clogging of the cover 65 occurs is smaller than the gas flow amount to the heater 68 in the case where the clogging of the cover 65 does not occur.

In contrast, the gas flow amount to the heater 68 in the case where cracking in the cover 65 occurs is larger than the gas flow amount to the heater 68 in the case where the cracking in the cover 65 does not occur.

Figure 9A:
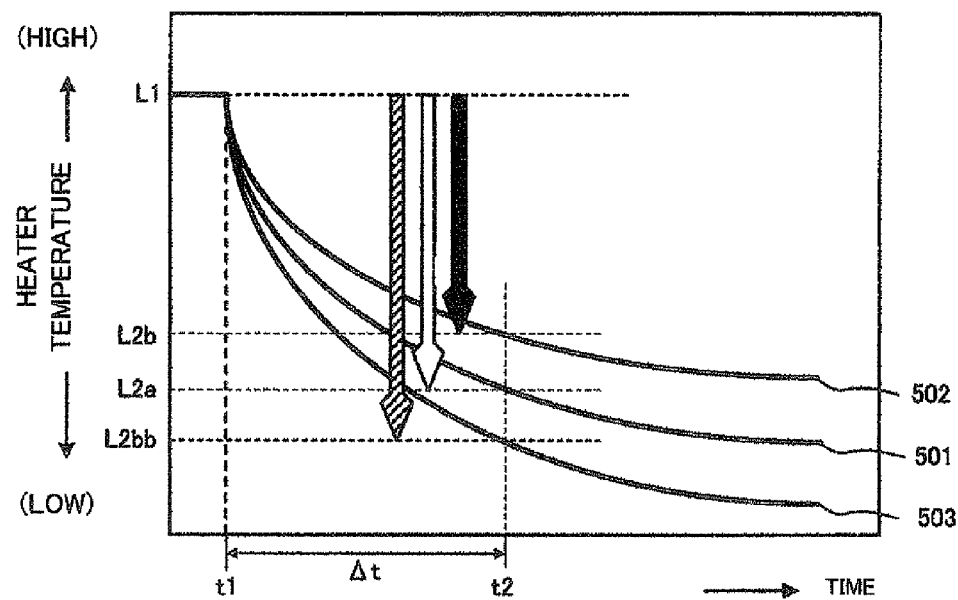
FIGS. 9A and 9B show the graphs each of which indicates the time variation of the temperature of the heater of the A/F sensor and the graphs each of which indicates the relationship between the temperature of the heater and the exhaust temperature.

FIG. 9A, similarly to FIG. 3, shows the graphs each of which indicates the time variation of the temperature of the heater 68 of the A/F sensor 42. The graph 501 indicates the temperature variation of the heater 68 in the case where both the clogging and the cracking in the cover 65 of the A/F sensor 42 do not occur, and the graph 502 indicates the temperature variation of the heater 68 in the case where the clogging in the holes of the cover 65 of the A/F sensor 42 occurs. The graph 503 indicates the temperature variation of the heater 68 in the case where the cracking in the cover 65 of the A/F sensor 42 occurs.

At the time t1, the ECU 50 stops the fuel injection by the fuel injection valve 5 thereby to stop the combustion in the cylinders 12 and lets the gas pass through the exhaust passage 14 from the intake air passage 13.

At the time t2 when a time period $\Delta t$ predetermined has elapsed since the time t1, the temperature of the heater 68, in the case where both the clogging and the cracking in the cover 65 do not occur, becomes L2a. In contrast, at the time t2, the temperature of the heater 68, in the case where the clogging in the holes of the cover 65 occurs, becomes L2b (>L2a) and the temperature of the heater 68, in the case where the cracking in the cover 65 occurs, becomes L2bb (<L2a).

As shown in FIG. 9A, the amount of the temperature decrease of the heater 68 over time becomes large because the amount of the gas flow to the heater 68, in the case where the cracking in the cover 65 of the A/F sensor 42 occurs, is larger than that in the case where the cracking in the cover 65 does not occur.

Hence, in the detection methods for the internal combustion engine in the applications for each of the above embodiments, the ECU 50 not only determines whether or not the clogging in the holes of the cover 65 occurs but also determines whether or not the cover 65 has cracked on the basis of the temperature variation of the heater 68.

In the application of the first embodiment, the ECU 50 not only determines whether or not the amount of the temperature decrease of the heater 68 is smaller than a predetermined clogging criterion value but also determines whether or not the amount of the temperature decrease is smaller than a predetermined cracking criterion value. Here, the cracking criterion value is a compatible value calculated by experimental trials and is set to a value which is smaller than the clogging criterion value. The ECU 50 determines that the cracking in the cover 65 occurs in the case where the amount of the temperature decrease of the heater 68 is smaller than the cracking criterion value, and determines that the cracking in the cover 65 does not occur in the case where the amount of the temperature decrease of the heater 68 is equal to or larger than the cracking criterion value. In other words, the ECU 50 determines that both the clogging and the cracking in the cover 65 of the A/F sensor 42 do not occur when the amount of the temperature decrease of the heater 68 is smaller than the clogging criterion value and equal to or larger than the cracking criterion value.

Figure 9B:
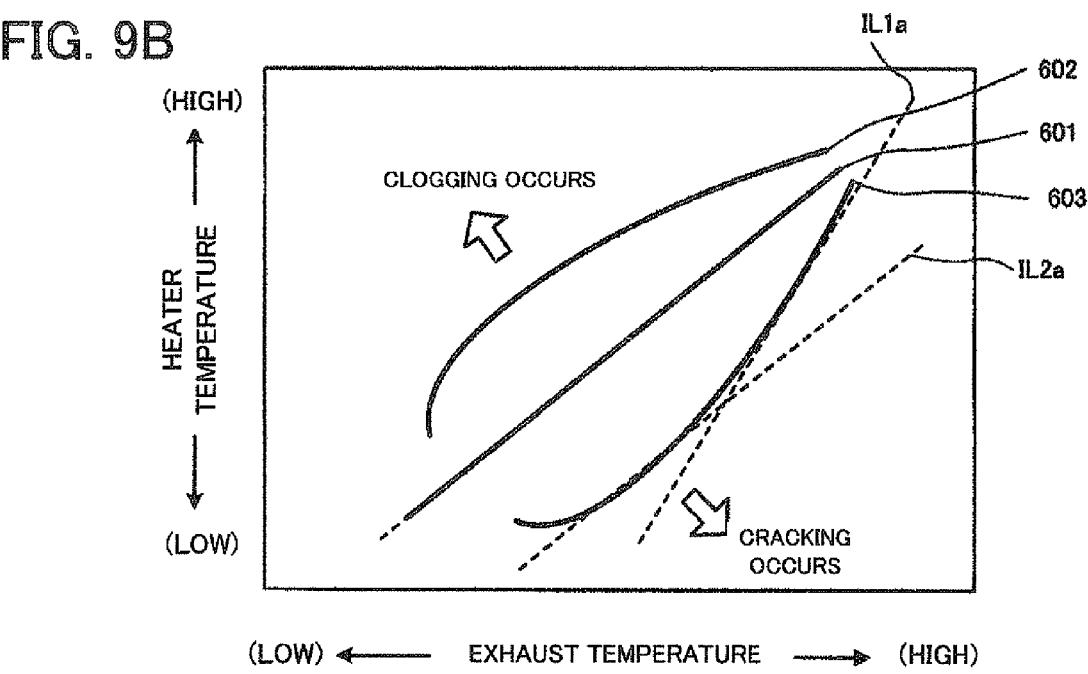

FIG. 9B, similarly to FIG. 63, shows the graphs each of which shows the relationship between the temperature of the heater 68 and the exhaust temperature. The graph 601 is a graph showing the relationship between the temperature of the heater 68 and the exhaust temperature in the case where both the clogging and the cracking in the cover 65 of the A/F sensor 42 do not occur. The graph 602 is a graph showing the relationship between the temperature of the heater 68 and the exhaust temperature in the case where the clogging in the holes of the cover 65 of the A/F sensor 42 occurs. The graph 603 is a graph showing the relationship between the temperature of the heater 68 and the exhaust temperature in the case where the cracking in the cover 65 of the A/F sensor 42 occurs.

As shown in FIG. 9B, whereas the graph 601 is approximately linear, the graph 603 is curved toward the direction where the temperature of the heater 68 becomes lower. As indicated by the graph 601, the temperature of the heater 68, in the case where both the clogging and the cracking in the cover 65 of the A/F sensor 42 do not occur, varies at an approximately constant rate to the variation of the exhaust temperature. In contrast, as shown in the graph 603, in the case where the cracking in the cover 65 of the A/F sensor 42 occurs, similarly to the case (see graph 602) where the clogging in the holes of the cover 65 occurs, the ratio of the temperature variation of the heater 68 to the variation of the exhaust temperature varies significantly.

For example, as indicated by the tangent lines IL1$a$, IL2$a$ to the graph 603, the gradient of the tangent line to the graph 603 becomes smaller and smaller as the exhaust temperature decreases from the temperature MO. In other words, as the exhaust temperature decreases from the temperature MO, the ratio of the temperature decrease of the heater 68, in the case where the cracking in the cover 65 of the A/F sensor 42 occurs, becomes smaller and smaller.

Hence, in the application of the second embodiment, the ECU 50 determines how the ratio of the temperature variation of the heater 68 to the variation of the exhaust temperature gradually changes in the case where the ratio of the temperature variation of the heater 68 to the variation of the exhaust temperature is not approximately constant. Concretely, the ECU 50 determines that the clogging in the holes of the cover 65 of the A/F sensor 42 occurs when the temperature of the heater 68 is changing toward the direction where the temperature becomes higher with the change of the exhaust temperature as indicated by the graph 602. On the other hand, the ECU 50 determines that the cracking in the cover 65 of the A/F sensor 42 occurs when the temperature of the heater 68 is changing toward the direction where the temperature becomes lower with the change of the exhaust temperature as indicated by the graph 603. For example, the ECU 50 determines that the clogging in the holes of the cover 65 of the A/F sensor 42 occurs in the case where the rate of the temperature decrease of the heater 68 is larger and larger as the exhaust temperature decreases from the temperature MO, and determines that the cracking in the cover 65 of the A/F sensor 42 occurs in the case where the rate of the temperature decrease of the heater 68 is smaller and smaller.

As described above, in the detection method in the application, it becomes possible not only to determine whether or not the clogging in the holes of the cover 65 occurs but also to determine whether or not the cracking in the cover 65 occurs on the basis of the temperature variation of the heater 68. It goes without saying that in the above application whether or not the clogging in the holes of the cover 65 occurs is also determined, but instead of this, only whether or not the cracking in the cover 65 occurs may be determined.

MODIFICATION

In each of the above embodiments and the application, the ECU 50 detects the temperature of the heater 68 based on the impedance of the heater 68 and determine whether or not the clogging in the holes of the cover 65 (or the cracking of the cover 65) occurs on the basis of the amount of temperature variation of the heater 68. However, instead of by using the temperature variation, by using an amount of impedance variation of the heater 68, the ECU 50 may determine whether or not the clogging in the holes of the cover 65 (or the cracking of the cover 65) occurs. For example, in the first embodiment, instead of determining whether or not the temperature variation between the time t1 and the time t2 is smaller than the clogging criterion value, the ECU 50 may determine whether or not the impedance variation between the time t1 and the time t2 is smaller than the impedance corresponding to the clogging criterion value.

In addition, the present invention is not limited to what is applied to the A/F sensor, but also can be applied to other various sensors. Further, in each of the above embodiments and the application, the above detection method is executed in order to determine whether or not the clogging in the holes of the cover occurs, but it is not limited to this. Namely, by executing the above detection process for a sensor which does not have a cover, it is also possible to determine whether or not the inhibitors adhere directly to the sensor precisely.

For example, instead of the A/F sensor, the present invention can also be applied to a case where a temperature sensor is used. In this case, by using the detection method in the each of the embodiments and the application, the ECU 50 can determine whether or not inhibitors adhere to the temperature sensor on the basis of the temperature variation detected by the temperature sensor. Here, it goes without saying that the ECU 50 may determine whether or not the inhibitors adhere by using a variation of a signal output value (voltage value and/or current value) correlated with the temperature supplied from the temperature sensor instead of using the temperature variation.

It also goes without saying that the present invention is not limited what is applied to sensors but also applied to a temperature varying member whose temperature varies in response to the gas flow in the exhaust passage.

In addition, the present invention is not limited to the above embodiments and these can be accordingly changed in the range where the changes do not go against the gist or the ideas which can be seen in all of the claims and the specification and the embodiments to which the changes is applied is also included in the technical scope of the present invention.

INDUSTRIAL APPLICABILITY

This invention can be used for an internal combustion engine which includes a temperature varying member such as a sensor which varies in response to an exhaust temperature.

The invention claimed is:

1. A detection device for an internal combustion engine which is applied to the internal combustion engine including a sensor equipped with a cover for covering a temperature varying member, which is provided in an exhaust system, and whose temperature varies due to gas flow in the exhaust system, comprising:
    a temperature correlation value detection unit which detects a correlation value which correlates with the temperature of the temperature varying member; and
    a variation calculating unit which calculates a variation of the correlation value, in a time period when the gas flow arises, detected by the temperature correlation value detection unit,
    wherein an exhaust temperature sensor which detects temperature of the gas is provided on a streamline which is approximately same as the streamline where the temperature varying member is provided in the exhaust system, and
    wherein the variation calculating unit calculates a rate of the variation of the correlation value to a variation of an exhaust temperature detected by the exhaust temperature sensor and detects clogging or cracking in the cover based on the rate of the variation.

2. The detection device for an internal combustion engine according to claim 1,
    wherein the temperature varying member is an electric heater of a gas sensor, and
    wherein the temperature correlation value detection unit detects impedance of the electric heater as the correlation value.

3. The detection device for an internal combustion engine according to claim 1,
    wherein the temperature varying member is a temperature sensor, and
    wherein the temperature correlation value detection unit detects a signal output value supplied from the temperature sensor as the correlation value.

4. The detection device for an internal combustion engine according to claim 1,
    wherein a filter member is provided in the exhaust system, and
    wherein the temperature varying member is provided at the downstream side of the filter member.

5. The detection device for an internal combustion engine according to claim 1,
    wherein a threshold of the variation is set according to an amount of inhibitors which adhere to the temperature varying member, and
    further comprising a determining unit which determines whether or not the variation calculated by the variation calculating unit is smaller than the threshold.

* * * * *